(12) United States Patent
Norberg et al.

(10) Patent No.: US 11,104,313 B2
(45) Date of Patent: Aug. 31, 2021

(54) PISTON PUMP HAVING AN OPERATING CHAMBER WITH AN INLET AND AN OUTLET A PRESSURE MEDIUM CONNECTION AND A CONNECTING DUCT FLUIDLY CONNECTING THE PRESSURE MEDIUM CONNECTION TO THE OPERATING CHAMBER IN AN ALTERNATING CONTROLLABLE MANNER

(71) Applicant: Robert Bosch GmbH, Stuttgart (DE)

(72) Inventors: Jens Norberg, Stuttgart (DE); Andreas Lechler, Moeglingen (DE); Patrick Schellnegger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 16/211,389

(22) Filed: Dec. 6, 2018

(65) Prior Publication Data

US 2019/0176786 A1    Jun. 13, 2019

(30) Foreign Application Priority Data

Dec. 13, 2017    (DE) ..................... 10 2017 222 546.7

(51) Int. Cl.
*F04B 7/02* (2006.01)
*F04B 7/04* (2006.01)
(Continued)

(52) U.S. Cl.
CPC .......... *B60T 8/4031* (2013.01); *F04B 7/0266* (2013.01); *F04B 7/04* (2013.01);
(Continued)

(58) Field of Classification Search
CPC ...... B60T 17/02; B60T 8/4031; F04B 7/0266; F04B 9/042; F04B 11/00; F04B 1/053; F04B 7/04
(Continued)

(56) References Cited

U.S. PATENT DOCUMENTS

| 1,922,121 | A | * | 8/1933 | Brown | .................... F04B 9/042 |
| | | | | | 137/115.13 |
| 3,091,180 | A | * | 5/1963 | Etienne | |

(Continued)

FOREIGN PATENT DOCUMENTS

DE    10 2005 042 196 A1    3/2007

*Primary Examiner* — Patrick Hamo
*Assistant Examiner* — Benjamin Doyle
(74) *Attorney, Agent, or Firm* — Maginot, Moore & Beck LLP

(57) ABSTRACT

A piston pump is configured to convey pressure medium in a pressure medium circuit, in particular in a braking circuit of a motor vehicle braking system that may be electronically controlled to counteract slip. The pump piston delimits an operating chamber and is received in a displaceable manner in a pump cylinder and may be driven to produce a stroke movement that goes back and forth between two reversing positions. The operating chamber may be connected in a controllable manner to a pump inlet or outlet. A pressure medium connection is provided from the pump outlet to the operating chamber, said pressure medium connection is controllable in dependence upon a relative position of the pump piston with respect to the first reversing position. Pressure pulsations of the piston pump are prevented and the operating noise is reduced.

9 Claims, 5 Drawing Sheets

(51) Int. Cl.
*F04B 49/035* (2006.01)
*B60T 8/40* (2006.01)
*F04B 11/00* (2006.01)
*B60T 17/02* (2006.01)
*F04B 9/04* (2006.01)
*F04B 1/053* (2020.01)

(52) U.S. Cl.
CPC ............ *F04B 11/00* (2013.01); *F04B 49/035* (2013.01); *B60T 17/02* (2013.01); *F04B 1/053* (2013.01); *F04B 9/042* (2013.01)

(58) Field of Classification Search
USPC .................................................. 417/471, 470
See application file for complete search history.

(56) References Cited

U.S. PATENT DOCUMENTS

| | | | | |
|---|---|---|---|---|
| 3,614,270 | A * | 10/1971 | Frank | |
| 3,850,548 | A * | 11/1974 | DeLancey | |
| 4,255,097 | A * | 3/1981 | Davis | |
| 4,354,715 | A * | 10/1982 | Farr | B60T 8/368 303/10 |
| 4,435,021 | A * | 3/1984 | Hoenick | B60T 8/326 188/181 A |
| 4,580,848 | A * | 4/1986 | Widmer | |
| 4,883,327 | A * | 11/1989 | Farr | B60T 8/4283 303/116.4 |
| 5,169,216 | A * | 12/1992 | Schmidt | B60T 8/348 188/DIG. 1 |
| 5,199,860 | A * | 4/1993 | Stegmaier | |
| 5,722,738 | A * | 3/1998 | Beck | B60T 8/4031 303/116.1 |
| 5,915,927 | A * | 6/1999 | Kuromitsu | B60T 8/4031 417/250 |
| 6,030,185 | A * | 2/2000 | Feigel | |
| 6,318,979 | B1 * | 11/2001 | Schuller | B60T 8/4031 137/860 |
| 6,386,842 | B1 * | 5/2002 | Reuter | |
| 6,786,232 | B2 * | 9/2004 | Schuller | B60T 8/4031 137/454.4 |
| 8,672,418 | B2 * | 3/2014 | Harada | F04B 1/0408 303/11 |
| 9,103,339 | B2 * | 8/2015 | Gammon | F04B 49/12 |
| 9,273,685 | B2 * | 3/2016 | Reuter | B60T 17/04 |
| 2010/0071362 | A1 * | 3/2010 | Alaze | |
| 2010/0101538 | A1 * | 4/2010 | Beardmore | F02M 59/466 123/495 |
| 2016/0108900 | A1 * | 4/2016 | Gaertner | |
| 2018/0304877 | A1 * | 10/2018 | Ciarrocchi | |

* cited by examiner

PISTON PUMP HAVING AN OPERATING CHAMBER WITH AN INLET AND AN OUTLET A PRESSURE MEDIUM CONNECTION AND A CONNECTING DUCT FLUIDLY CONNECTING THE PRESSURE MEDIUM CONNECTION TO THE OPERATING CHAMBER IN AN ALTERNATING CONTROLLABLE MANNER

This application claims priority under 35 U.S.C. § 119 to patent application number DE 10 2017 222 546.7, filed on Dec. 13, 2017 in Germany, the disclosure of which is incorporated herein by reference in its entirety.

BACKGROUND

The disclosure is based on a piston pump for conveying pressure medium in a pressure medium circuit as set forth in the following description. Piston pumps of this type are already known by way of example from DE 10 2005 042 196 A1.

This known piston pump comprises a pump piston that delimits an operating chamber and is received in a displaceable manner in a pump cylinder. The pump piston is driven by an electromotively-driven drive element to produce a stroke movement that goes back and forth. The operating chamber comprises a maximum volume in a first reversing position of the pump piston and a minimum volume in a second reversing position of the pump piston. In order to convey pressure medium, the operating chamber may be connected to a pump inlet or to a pump outlet. The respective connection of the operating chamber to the pump inlet or to the pump outlet is provided in an alternating manner and is controlled by spring-influenced non-return valves.

In vehicle brake systems that may be electronically controlled to counteract slip or so-called ABS, ASR or ESP brake systems, a piston pump of this type is used to generate braking pressure in the wheel brakes. The cyclical exchange between an intake and a discharge of pressure medium, which takes place in a piston pump, leads to pressure pulsations that may propagate in a piping system that is connected to the piston pump and via the vehicle body of a motor vehicle as far as a passenger compartment. The pressure pulsations are possibly audible for the vehicle occupants as disruptive operating noise in said passenger compartment, in particular if the vehicle brake system is active within the scope of driver assist functions, such as by way of example an automatic distance control function.

Laboratory tests have shown that inter alia a so-called zero conveying travel or zero conveying angle in the case of piston pumps causes pressure pulsations. These variables refer to a travel or an angle of rotation of a drive element during which in the piston pump the pressure medium is compressed by the pump piston to the conveying pressure prior to the pressure medium being pushed out by the pump piston into the pump outlet. The compression phase of a pump piston or a piston pump starts on account of the zero conveying travel or the zero conveying angle prior to actually starting to convey pressure medium. The resulting higher piston speed when starting to convey pressure medium leads to a more intense acceleration of the fluid column in the operating chamber of the piston pump and results in more intense pressure pulsations. The zero conveying travel or zero conveying angle of a piston pump furthermore indeed increases if gas escapes from the pressure medium in the case of an only part-filled piston pump or if steam is formed as a result of cavitation in the piston pump.

SUMMARY

The piston pump in accordance with the disclosure having the features of the following description in contrast has the advantage that the start of the compression phase and the start of a piston pump conveying pressure medium converge in terms of time. This is achieved by means of a pressure medium connection between the pump outlet and the operating chamber of the piston pump, said pressure medium connection being produced or opened shortly prior to the end of an intake phase of the pump piston. The negative pressure in the operating chamber that prevails until that point is increased via the opened pressure medium connection to the conveying pressure and the conveying phase of the piston pump may commence with relatively little delay or ideally with no delay as soon as the pump piston has left its first reversing position. The procedure of conveying the pressure medium consequently starts at a lower speed of the pump piston and the fluid column in the operating chamber of the piston pump is accelerated to a lesser extent. The result is that as a consequence the pressure pulsations and also the operating noise of the piston pump that may be possibly perceived as disruptive reduce.

Further advantages or advantageous further developments of the disclosure are evident from the following description.

The pressure medium connection between the pump outlet and the operating chamber of the piston pump is controlled in an advantageous manner by the pump piston or by a component that is fixed to the pump piston. This is conceivable in that an orifice cross section of the pressure medium connection is arranged on the periphery of the pump cylinder and is traversed by the pump piston that moves back and forth. Additional devices for controlling the pressure medium connection at the piston pump are therefore not required and neither installation space, construction costs nor outlay are incurred for controlling this pressure medium connection in a time-synchronized manner with respect to the piston movement.

By selecting the shape of the orifice cross section in the operating chamber it is possible to further optimize the operating noises of the piston pump. The same applies for a configuration of a stage between two connecting sections of this pressure medium connection, said connecting sections comprising cross sections of different sizes. The connecting section having the smaller cross section is in this case facing the operating chamber of the piston pump.

Further improvements are rendered possible by means of arranging a non-return valve in the pressure medium connection, said non-return valve preventing a direct outflow of the pressure medium from the operating chamber to the pump outlet and only allowing a flow of pressure medium that flows from the pump outlet to the operating chamber.

BRIEF DESCRIPTION OF THE DRAWINGS

An exemplary embodiment of the disclosure is explained in detail in the following description and is illustrated in the drawing. In the drawing

DETAILED DESCRIPTION

Figure 1A:
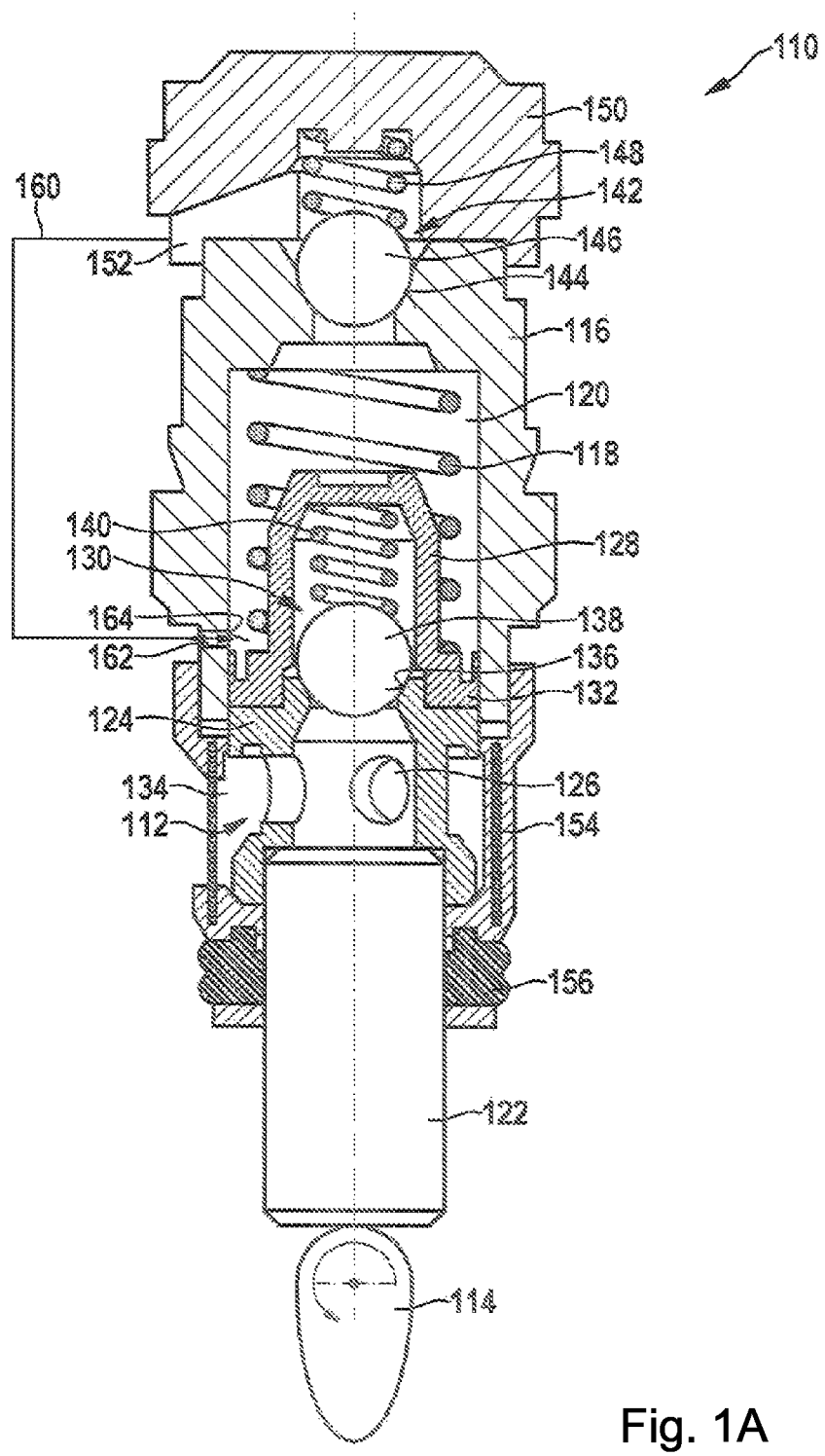
FIG. 1A illustrates a piston pump that forms the basis of the disclosure in the longitudinal section, wherein the piston is illustrated in its first reversing position.
Figure 1B:
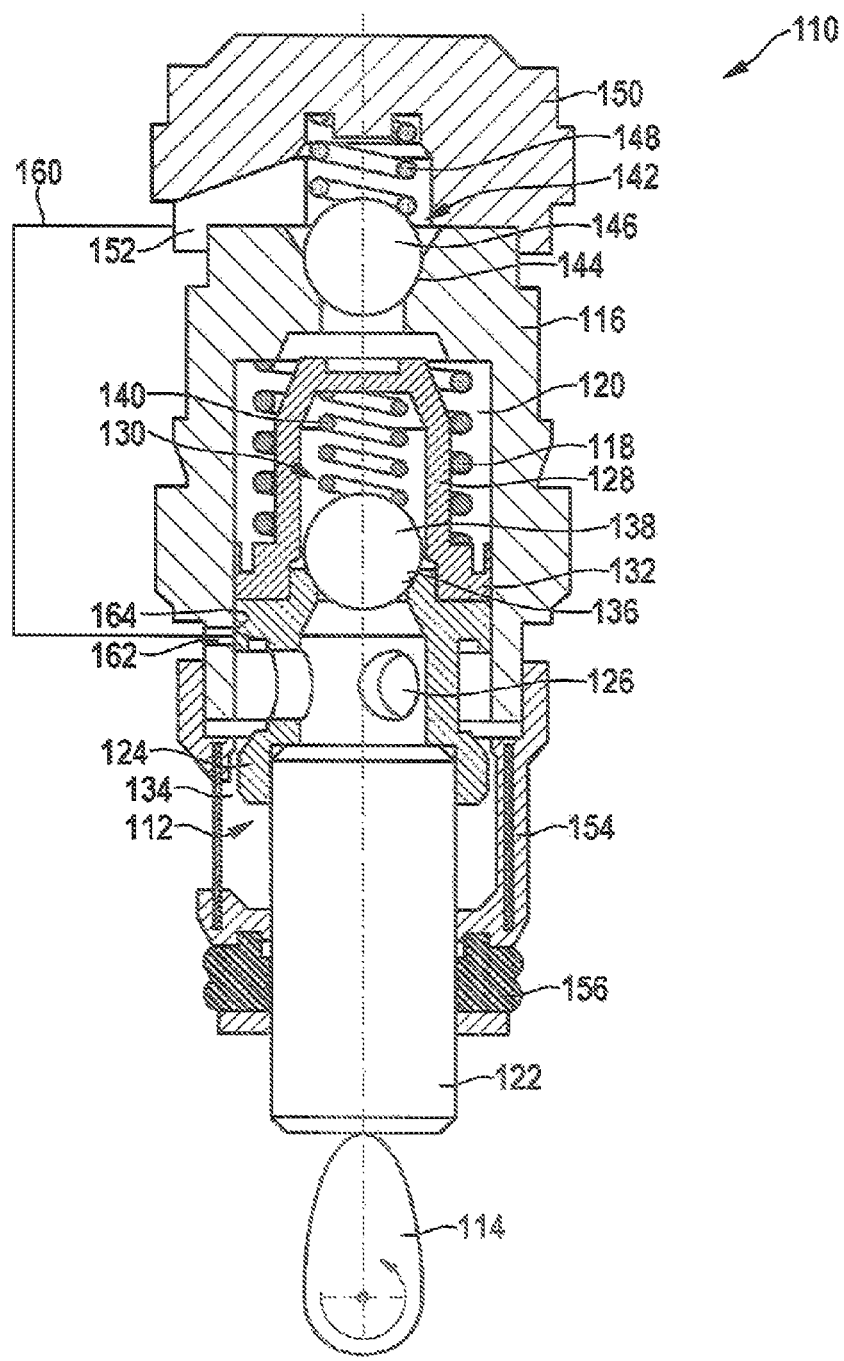
FIG. 1B illustrates the piston pump of FIG. 1A in its second reversing position.

The piston pumps 110 that are illustrated in two different piston positions according to the FIGS. 1a and 1b comprise respectively a pump piston 112 that may be driven by a drive element 114, which performs a rotational movement, to produce a stroke movement that goes back and forth. The pump piston 112 is for this purpose received in an exemplary manner displaceably in a cylindrical cylinder liner 116 and is influenced by the drive element 114 in an opposing direction to the force of a return spring 118. This return spring 118 is arranged in the interior of an operating chamber 120 of the piston pump 110 and supports itself using one of its ends on a base of the cylinder liner 116 and using the opposite-lying second end on an end surface of the pump piston 112 that delimits the operating chamber 120. The pump piston 112 is embodied from multiple parts and is embodied from a first piston part 122 that lies in the shape of a solid cylinder roller against a drive element 114, a second piston part 124 in the form of a sleeve that engages on the periphery of the cylinder roller, inlet openings 126 of the piston pump 110, which are oriented in a transverse manner with respect to the sleeve axis and issue into the hollow interior of said sleeve, and also a third piston part 128 that is embodied in a pot shape and forms a valve housing of an inlet valve 130 of the piston pump 110. The third piston part 128 grips around a support that has a peripheral bead 132 and is embodied on the second piston part 124 on the end that faces the third piston part 128, said bead being embodied on its periphery to a sealing contour. The operating chamber 120 of the piston pump 110 is sealed with respect to a pump inlet 134 with the aid of this sealing contour. The pump inlet 134 is controllably connected via the inlet valve 130 to the operating chamber 120. For this purpose, the inlet valve 130 comprises an inlet valve seat 136 that is embodied on the end of the second piston part 124 that is facing the third piston part 128, an inlet valve body 138 that controls this inlet valve seat 136 and an inlet valve spring 140 that influences the inlet valve body 138 against the inlet valve seat 136. Inlet valve body 138 and inlet valve spring 140 are housed in the interior of the inlet valve housing that is arranged on the second piston part 124. The inlet valve housing is provided with openings that are not visible and which in the case of an opened inlet valve 130 allow pressure medium from the pump inlet 134 of the piston pump 110 to pass into the operating chamber 120.

Furthermore, the piston pump 110 comprises an outlet valve 142 for controlling an outlet valve seat 144 that is embodied on the cylinder liner base. The outlet valve seat 144 is likewise controlled by a spring-loaded outlet valve body 146. An outlet valve spring 148 is supported for this purpose on a plug 150 that is centered via a band on the cylinder liner 116. A pump outlet 152 that is oriented transversely with respect to the longitudinal axis of the piston pump 110 is embodied on the plug 150 via which pressure medium that escapes from the outlet valve 142 is discharged.

The inlet valve 130 and the outlet valve 142 control a flow of a pressure medium flow through the piston pump 110 in that said inlet valve and outlet valve connect their operating chamber 120 in an alternating manner to the pump inlet 134 or to the pump outlet 152. Inlet valve 130 and outlet valve 142 open and close in dependence upon the pressure ratios in the interior of the operating chamber 120, said pressure ratios being determined by the manner in which the piston is actuated. If this operating chamber 120 comprises its maximum volume, as is illustrated in FIG. 1a, in other words if the pump piston 112 is located in its first reversing position in accordance with FIG. 1a, low pressure prevails in the operating chamber, by means of which the inlet valve 130 is actuated in an opening manner and the outlet valve 142 is actuated in a closing manner Pressure medium flows in this case into the operating chamber 120.

Prior to this, this pressure medium also flows through a filter element 154 that filters impurities from the pressure medium before said impurities can penetrate into the interior of the piston pump 110. The filter element 154 is fastened to the open end of the cylinder liner 116. Furthermore, the filter element 154 is fitted with a filter sealing arrangement 156 that seals the pump inlet 134 with respect to the space in which the rotating drive element 114 is located.

In accordance with FIG. 1b, the pump piston 112 is actuated by the drive element 114 in such a manner that the operating chamber 120 comprises its minimum volume. The pump piston 112 is therefore located in its second reversing position. In this case, a high pressure prevails in the interior of the operating chamber 120, which influences the inlet valve 130 in the closing direction and the outlet valve 142 in the opening direction. The pressure medium flows out of the operating chamber 120 to the pump outlet 152 through the opened outlet valve 142.

Since in this respect the construction and function of the explained piston pump correspond to the prior art, further statements in relation to this are omitted.

In accordance with the disclosure a pressure medium connection 160 is embodied between the pump outlet 152 and the operating chamber 120 and said pressure medium connection may be controlled in dependence upon the relative position of the pump piston 112 with respect to the first reversing point. This pressure medium connection 160 comprises a connecting duct 162 that is preferably embodied in a pump housing that receives the piston pump 110 and said connecting duct issues into the operating chamber 120 of the piston pump 110. An allocated orifice 164 is embodied on the periphery of the cylinder liner 116 of the piston pump 110. The orifice may consequently be controlled by the pump piston 112 that moves back and forth and said orifice is positioned on the cylinder liner 116 in such a manner that the orifice cross section is only opened if the pump piston 112 approaches its first reversing position or is in its first reversing position. In this position of the pump piston 112 the operating chamber 120 of the piston pump 110 comprises its maximum volume. The pressure ratios in the operating chamber 120 change on account of the pressure medium connection that is then connected to the pump outlet 152. In lieu of the low pressure that hitherto prevails on account of the piston movement direction, the high pressure that prevails at the pump outlet 152 now prevails. This pressure change takes place within a relatively short period of time and in particular at a point in time in which the outlet valve 142 is still closed, the piston pump 110 therefore does not convey pressure medium. The pressure medium consequently starts to be conveyed by means of opening the outlet valve 142 immediately after the reversal of movement direction of the pump piston 112. The compression phase and the point at which a piston pump 110 in accordance with the disclosure starts to convey the pressure medium converge in terms of time with respect to one another or ideally start at the same point in time. The effect of this is that the idle travel of the pump piston 112, in other words the necessary piston stroke for compressing the pressure medium, reduces to the pressure level at which pressure medium is conveyed.

As explained in the case of the described exemplary embodiment, the pressure medium connection 160 is controlled by means of the pump piston 112 or by means of the inlet valve housing (piston part 128) that is arranged on the pump piston 112, which represents a particularly cost-effective solution that saves installation space since it is not necessary to provide separate control means. Nevertheless, this solution is not the only possibility for controlling this pressure medium connection 160. Fundamentally, by way of example a control procedure by means of a valve that may be electronically actuated, such as by way of example a solenoid valve, would also be conceivable.

A further possibility for optimizing the explained effect of the proposal in accordance with the disclosure is embodied in the selection of the embodiment, dimensioning and/or orienting the cross section of the orifice 164 into the operating chamber 120. This orifice cross section may have, for example as an alternative to a circular shape of a hole, the shape of a rectangle, square, triangle, oval or a trapeze. In the case of controlling the orifice cross section by means of the pump piston 112, the transition from the closed state to the opened state may be performed in a uniform manner and may be adjusted to the respective application by means of orienting the orifice cross section in a plane.

Figure 2:
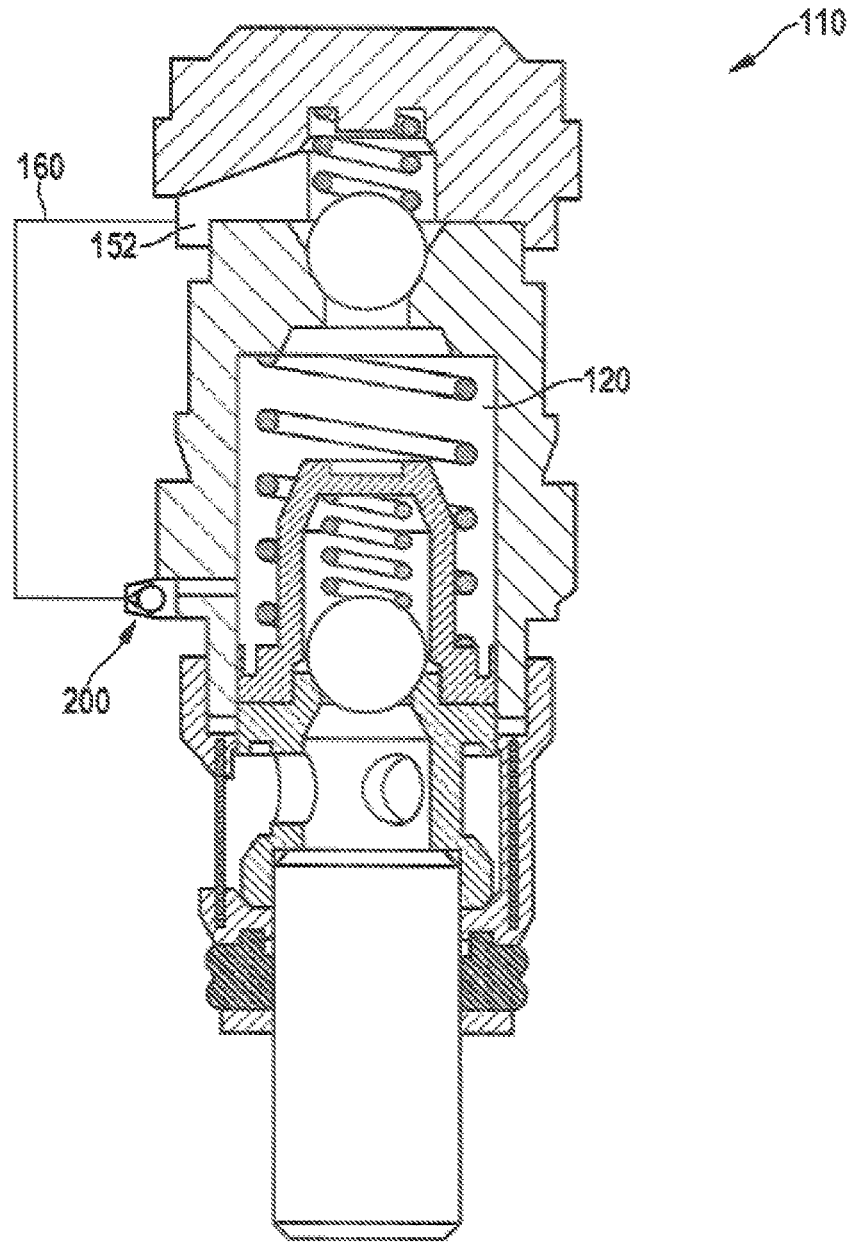
FIG. 2 illustrates a first further development of a piston pump in accordance with the disclosure in which a non-return valve is arranged in a pressure medium connection from the pump outlet to the operating chamber of the piston pump.

It is also conceivable in addition to fit the pressure medium connection 160 with a non-return valve 200 or to control said pressure medium connection using a non-return valve as is illustrated schematically in FIG. 2. This non-return valve 200 would be arranged or embodied in such a manner that said non-return valve blocks a pressure medium flow in the direction of the operating chamber 120 to the pump outlet 152 and only allows said pressure medium flow in the direction from the pump outlet 152 to the operating chamber 120. In this manner, by way of example the efficiency of a piston pump 110 may be improved in that a direct discharge of pressure medium from the operating chamber 120 to the pump outlet 152 or a hydraulic short circuit between the operating chamber 120 and the pump outlet 152 is prevented during a compression phase of the piston pump 110 despite a drop in pressure that possibly occurs from the operating chamber 120 in the direction of the pump outlet 152.

Figure 3:
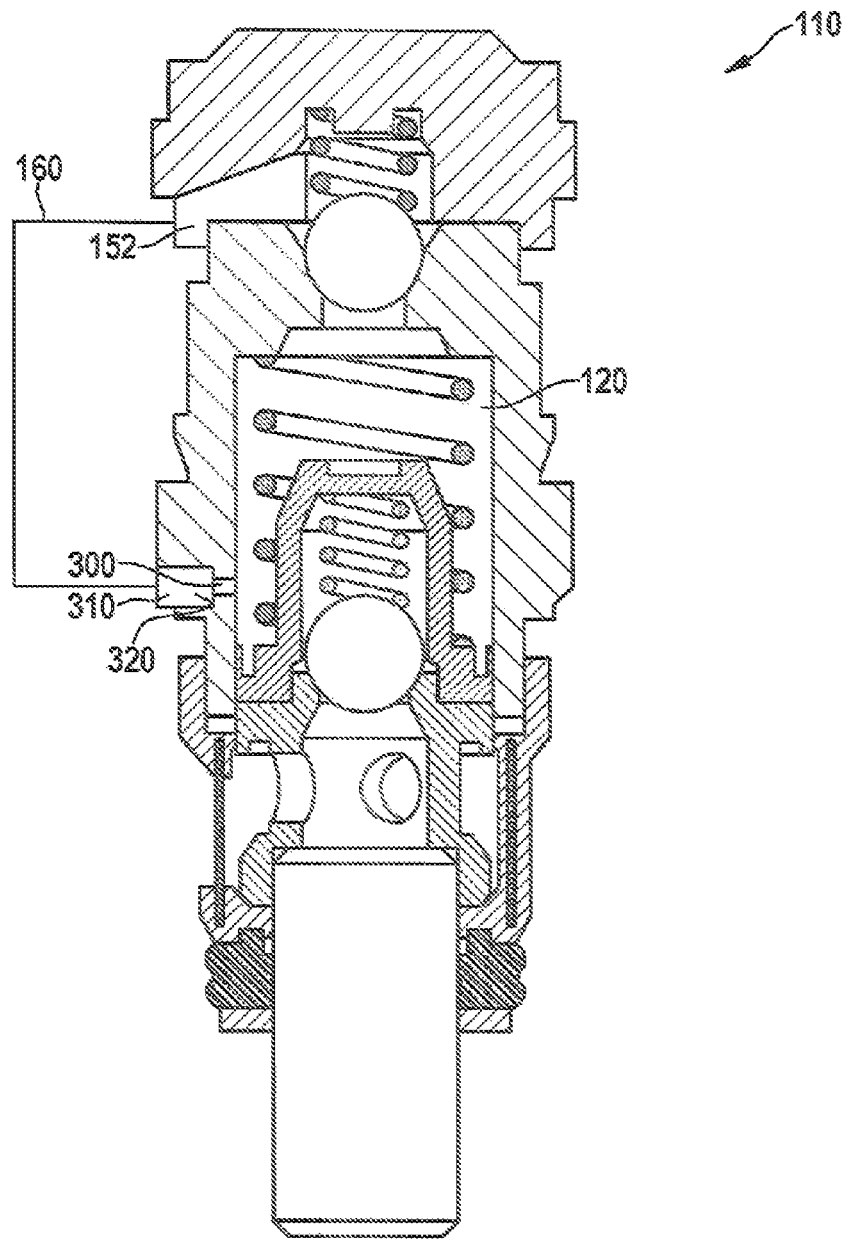
FIG. 3 illustrates a second further development of a piston pump in accordance with the disclosure in which a pressure medium connection from the pump outlet to the operating chamber of the piston pump comprises connecting sections that have different sized cross sections and FIG. 4A illustrates the stroke of a pump piston that is embodied in accordance with the disclosure (FIG. 4A is plotted over the time or the stroke of the pump piston)

The pressure medium connection 160 in the region of the cylinder liner 116 is illustrated in the FIGS. 1*a* and 1*b* in an exemplary manner as a cylindrical hole that has a constant through-going hole diameter. A pressure medium connection 160 that is embodied in stages, in other words a pressure medium connection 160 of at least two connecting sections 300, 310 of different sized cross sections, as illustrated schematically in FIG. 3, however would likewise be conceivable in this context. In this case, the connecting section 300 having the smallest cross section is to be arranged on the end of the pressure medium connection 160 that is facing the operating chamber 120 of the piston pump 110 and accordingly determines the size of the orifice cross section into the operating chamber 120. Transitions 320 from one connecting section 300, 310 to the other may be embodied as a rectangular stage/as rectangular stages or may be embodied in an advantageous flow technical manner as ramps with or without rounded transition radii (the number of said transition radii not being specified).

FIGS. 4*a*-4*d* illustrate the operating principle of the explained disclosure with reference to characteristic curves that are recorded time-synchronously with one another.

The characteristic curve 410 in diagram 4*a* illustrates the stroke that is transferred from a drive element 114 to a pump piston 112. This stroke continuously increases after a point in time t1. The compression phase of the piston pump 110 accordingly starts at the point in time t1, in other words, the pump piston 112 starts to move from its first reversing point in the direction of its second reversing point and in so doing successively reduces the volume of the operating chamber 120 (operating stroke).

Figure 4A:
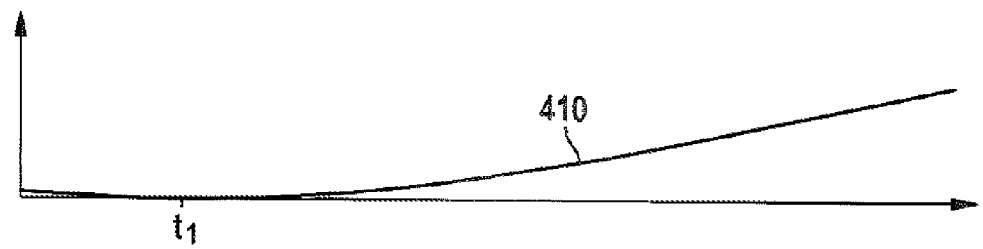
Figure 4B:
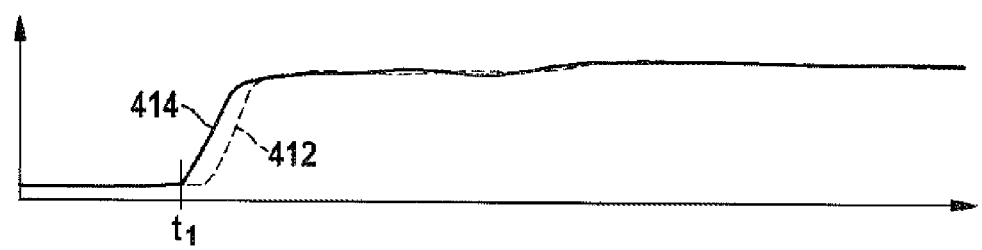
FIG. 4B illustrates the pump interior pressure of a piston pump that is embodied in accordance with the disclosure in comparison to a conventionally embodied piston pump that is known from the prior art (FIG. 4B is plotted over the time or the stroke of the pump piston)

Diagram 4*b* illustrates the curve of the pressure level in the interior of the operating chamber in a manner that is synchronized in terms of time with FIG. 4*a*. The dashed line 412 illustrates in this case the curve in the case of a conventional piston pump and the solid line 414 illustrates the curve in the case of a piston pump in accordance with the disclosure. It is evident in diagram 4*b* that in the case of a piston pump in accordance with the disclosure the pressure increase starts directly at the point in time t1, while this pressure increase in the case of a conventional piston pump is in contrast time-delayed.

Figure 4C:
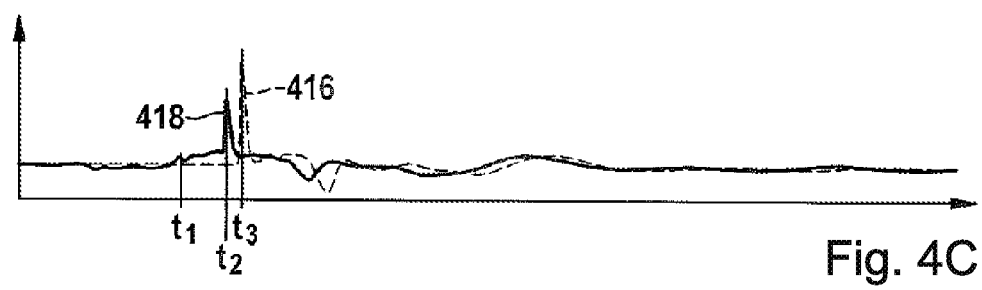
FIG. 4C illustrates the pressure gradient of a piston pump that is embodied in accordance with the disclosure in comparison to a conventionally embodied piston pump that is known from the prior art (FIG. 4C is plotted over the time or the stroke of the pump piston)

FIG. 4*c* in contrast illustrates the pressure gradient curve 416 in the case of a conventional piston pump (dashed line) in comparison with the pressure gradient curve 418 of a piston pump in accordance with the disclosure (solid line). The pressure gradient illustrates how rapidly the pressure level in the interior of the operating chamber 120 of the respective piston pump 110 changes. In the case of a piston pump 110 according to the disclosure, the pressure in the operating chamber 120 already slowly increases after the point in time t1 and reaches its maximum changing speed at the point in time t2, whilst in the case of a conventional piston pump the pressure level at the point in time t1 initially does not change at all and the maximum changing speed occurs at a later point in time t3 with respect to t2. T3 is clearly higher than in the subject matter of the disclosure. This diagram 4*c* therefore illustrates that in the subject matter of the disclosure the pressure build up takes place earlier and more uniformly than in the case of a conventional piston pump.

Figure 4D:
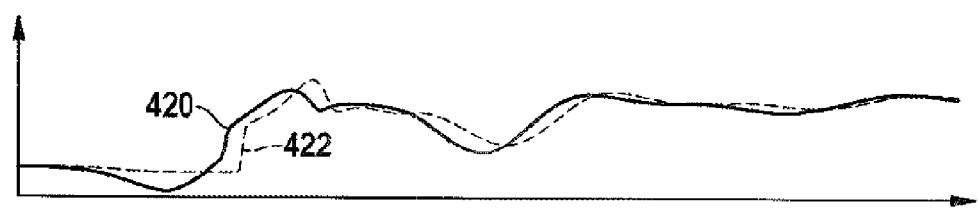
FIG. 4D illustrates the pressure pulsation during the compression phase of a piston pump that is embodied in accordance with the disclosure in comparison to a conventionally embodied piston pump that is known from the prior art (FIG. 4D is plotted over the time or the stroke of the pump piston).

Finally, in FIG. 4*d* the pressure pulsation 420 of a piston pump in accordance with the disclosure (solid line) are plotted against the pressure pulsations 422 of a conventional piston pump (dashed line). Owing to the cyclical operating principle in the case of piston pumps, pressure pulsations cannot be avoided, nevertheless it is apparent from these characteristic curves 420, 422 that the pressure pulsations in the case of the subject matter of the disclosure have a flatter curve and adopt a lower maximum value than in the case of known piston pumps. This illustrates the effect of the explained measures, said effect damping the pressure pulsations. The pressure pulsations that cannot be avoided in the case of piston pumps cause noises that are less intense and less able to be perceived as disruptive in the case of the subject matter of the disclosure.

Further changes and amendments with respect to the described exemplary embodiments of the disclosure are obviously conceivable without deviating from the fundamental idea of the disclosure.

What is claimed is:

1. A piston pump configured to convey pressure medium in a braking circuit of a motor vehicle braking system that is electronically controlled to counteract slip, the piston pump comprising:
   a pump cylinder defining an operating chamber and a connecting duct;
   a pump inlet operatively connected to the operating chamber;
   a pump outlet operatively connected to the operating chamber;
   a pump piston received in a displaceable manner in the operating chamber and configured to be driven to produce a stroke movement that alternates between a first reversing position and a second reversing position, wherein the operating chamber comprises a maximum volume in the first reversing position of the pump piston and a minimum volume in the second reversing position of the pump piston, and wherein the operating chamber is fluidly connected in an alternating controllable manner respectively to one of the pump inlet and the pump outlet; and
   a pressure medium connection from the pump outlet to the connecting duct,
   wherein when the pump piston is in the first reversing position, the connecting duct fluidly connects the pressure medium connection to the operating chamber, and
   wherein when the pump piston is in the second reversing position, the connecting duct is closed.

2. The piston pump according to claim 1, wherein:
   the connecting duct defines an orifice cross section opening to the operating chamber, and
   fluid flow through the orifice cross section is controlled by a position of the pump piston.

3. The piston pump according to claim 2, wherein the orifice cross section is one of circular, rectangular, triangular, square, oval, and trapezoidal.

4. The piston pump according to claim 1, wherein the pressure medium connection is controlled by a non-return valve that allows a flow in the flow direction from the pump outlet to the operating chamber and blocks a flow in the opposite flow direction thereto from the operating chamber to the pump outlet.

5. The piston pump according to claim 1, wherein:
   the pressure medium connection comprises at least two connecting sections of different sized cross sections, and
   a first of the at least two connecting sections comprises the smallest cross section and faces the operating chamber.

6. The piston pump according to claim 5, wherein a transition between the at least two connecting sections is one of a right-angled shoulder and a ramp.

7. The piston pump according to claim 1, wherein:
   the connecting duct defines an orifice cross section opening to the operating chamber, and
   fluid flow through the orifice cross section is controlled by a position of a component that is fastened to the pump piston and is configured for movement with the pump piston.

8. The piston pump according to claim 1, wherein the connecting duct is spaced apart from the pump inlet.

9. The piston pump according to claim 2, wherein when the pump piston is in the second reversing position, the pump piston covers the orifice cross section to prevent fluid from the pressure medium connection flowing into the operating chamber through the connecting duct.

* * * * *